United States Patent [19]

Boudreau

[11] Patent Number: 4,510,545

[45] Date of Patent: Apr. 9, 1985

[54] CAPSTAN CLEANER FOR EIGHT-TRACK CASSETTES

[76] Inventor: Normand Boudreau, P.O. Box 29, Lac-des-Iles, Canada, J0W 1J0

[21] Appl. No.: 416,942

[22] Filed: Sep. 13, 1982

[51] Int. Cl.³ .............................................. G11B 5/41
[52] U.S. Cl. ................................... 360/128; 360/137; 15/DIG. 12
[58] Field of Search ............................. 360/128, 137; 15/DIG. 12–DIG. 14, 99–100, 256.5

[56] References Cited

U.S. PATENT DOCUMENTS

| | | | |
|---|---|---|---|
| 3,439,922 | 4/1969 | Howard | 360/137 |
| 3,955,214 | 5/1976 | Post et al. | 360/128 |
| 4,141,053 | 2/1979 | Kara | 360/128 |
| 4,272,796 | 6/1981 | Van Kreuningen et al. | 360/128 |

FOREIGN PATENT DOCUMENTS

| | | |
|---|---|---|
| 1004352 | 1/1977 | Canada . |
| 1005573 | 2/1977 | Canada . |
| 1050437 | 3/1979 | Canada . |
| 1103801 | 6/1981 | Canada . |
| 1094680 | 1/1985 | Canada . |
| 2066999 | 7/1981 | United Kingdom ............... 360/128 |

*Primary Examiner*—A. J. Heinz

[57] ABSTRACT

A capstan cleaner for cassettes is disclosed, comprising a standard cassette casing provided with a cleansing wad located at the front end of the casing opposite the capstan of a cassette player when the cassette casing is in position therein. A pair of upright members are provided in the casing on either side of the wad. A flexible band has a rear end projecting out of the rear side of the casing and a front end portion passing over the front surface of both upright members and behind the wad. The front end of the band is rigidly secured to a peg spaced rearwardly and away from the wad in the casing. Pulling the rear end of the band biases the wad frontwardly into contact with the capstan for efficient cleansing thereof.

3 Claims, 3 Drawing Figures

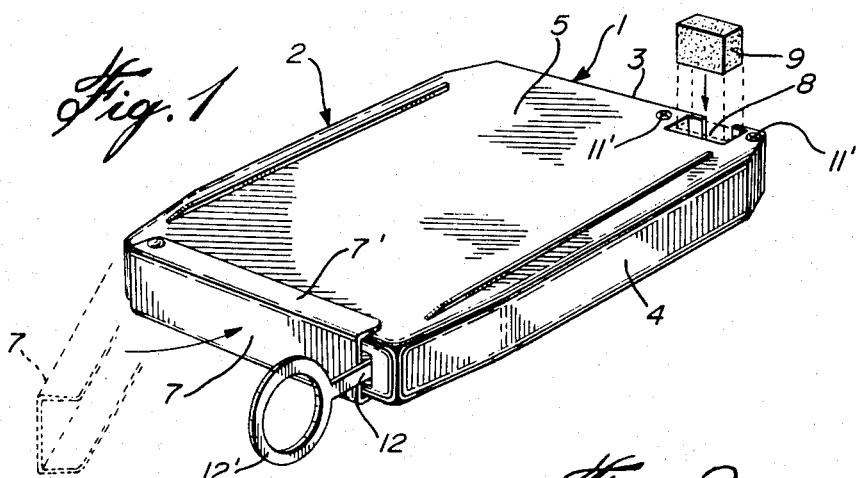
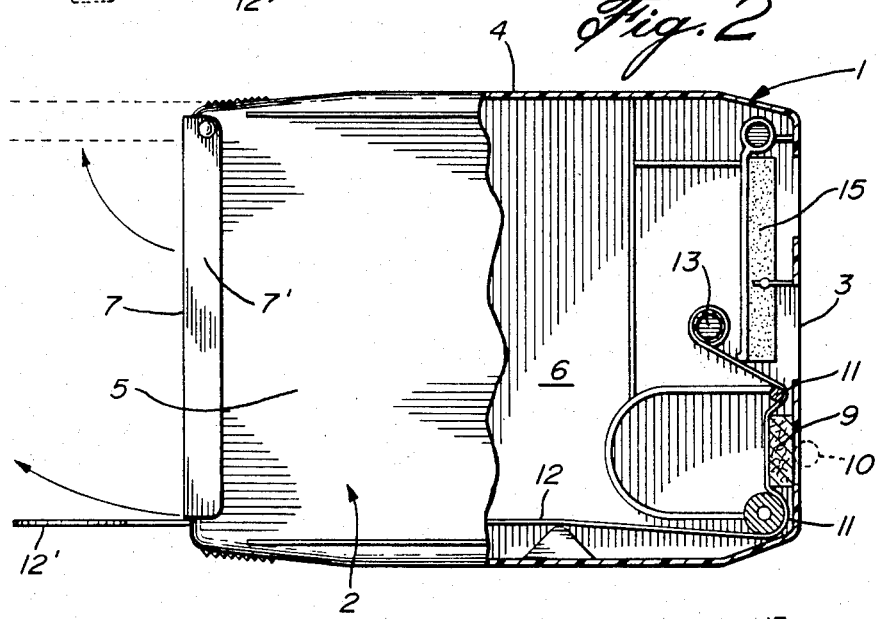
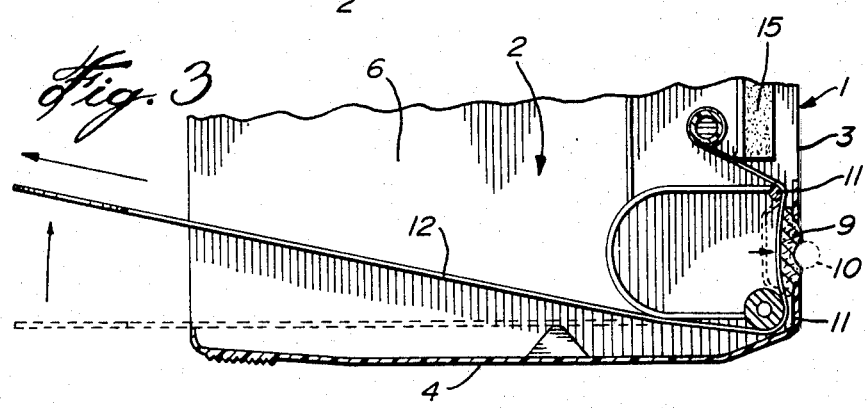

CAPSTAN CLEANER FOR EIGHT-TRACK CASSETTES

FIELD OF THE INVENTION

The present invention relates to service accessories for cassette players, more specifically to a capstan cleaner for eight-track cassettes.

BACKGROUND OF THE INVENTION

Cassette tape-recorders all make use of an upright cylindrical element, known as a capstan, which entrains the tape from the feed spool, past the recording and playing heads and to the take-up spool. The capstan is adapted to be pressed against an upright follower wheel such that the tape passes between the capstan and the follower wheel. Because of this contact between tape and capstan, the latter will pick up fine particles of dust and dirt on its rotating surface from the tape. If the surface of the capstan is not cleaned after a certain duration of playing and/or recording time, the undesired particles will be retransferred to the tape, thereby leading to a very noticeable loss of sound fidelity.

The prior art teaches a device adapted specifically to overcome this problem, namely: Canadian Pat. No. 1,103,801 dated June 23, 1981 for "KIT FOR CLEANING TAPE CARTRIDGE PLAYBACK UNIT". The latter teaches the use of an eight-track cassette casing, somewhat modified, and including a slot to obviate mechanism 16, 17 which, in turn, activates the capstan 13. The capstan is cleaned firstly by an abrasive 22 and then by a cotton swab 23, which is pushed by a rod 26, 27. One disadvantage of this particular patent is that the abrasive used eventually wears down the surface of a capstan. Another disadvantage is that neither the abrasive nor the cotton swab cleans the total surface of the capstan.

OBJECTS OF THE INVENTION

Accordingly, it is an important object of this invention to provide a capstan cleaner for eight-track cassette players which effectively cleans the total surface of the capstan and which is manually operated by a semi-flexible band.

It is another object of the present invention to provide a capstan cleaner of the above type, which is incorporated in a standard eight-track cassette casing having certain simple modifications.

SUMMARY OF THE INVENTION

The above and other objects and advantages of the present invention are realized according to a preferred embodiment comprising a standard eight-track cassette casing in combination with the novel elements of the invention. The latter include a cut-out portion made in the casing at its insertable end adjacent the capstan of the cassette player when the casing is installed in position in the cassette player. The cut-out portion is adapted to removably receive a relatively soft cleansing wad or pad.

Forward biasing means are provided to push the wad into touch with the capstan. This means consists of a semi-flexible band having one end extending rearwardly and projecting out of the rear side of the cassette. The opposite end portion of the band extends around the front surface of two laterally-spaced rigid upright members and behind the wad, one such member being located at each side of the cleaning wad. The opposite end of the band is attached to a securing means rearwardly and away from the two upright members in the casing.

As will be readily appreciated, the cleansing wad is biased into contact with the capstan by simply pulling on the rear end of the band, thereby pushing the portion of the band between the two upright members against the cleansing wad which in turn contacts the capstan.

Preferably, the front end of the casing is further provided with a cushion element to protect the playing and recording heads of the cassette player while the capstan is being cleaned.

Preferably also, the rear side of the casing has a door pivoted at one corner of the casing, opposite the rear corner adjacent the band. When the door is open, the band can be pulled laterally to exert pressure on the cleansing wad. Pulling the band directly rearwardly might tend to dislodge the cassette from its player, even though a locking mechanism is usually provided to keep the cassette in place. Also, the door provides access to a plurality of cleansing wads stored in the casing as replacements.

A grasp means is preferably provided at the rear end of the band to facilitate manipulation thereof.

BRIEF DESCRIPTION OF THE DRAWINGS

The above will be more clearly understood by having referral to the preferred embodiment of the invention, illustrated by way of the accompanying drawings, in which:

FIG. 1 is a perspective view of the capstan cleaner according to the invention;

FIG. 2 is a top plan view of the casing, partially broken away to show the interior front portion thereof; and FIG. 3 is another top plan view, partially sectioned, of the right-side portion of the casing, also showing the band pulled taut.

Like numerals refer to like elements throughout the drawings.

DETAILED DESCRIPTION OF THE PREFERRED EMBODIMENT

The capstan cleaner 1 of the invention comprises, in combination, a standard eight-track cassette casing 2 having a front, insertable end 3 adapted to be inserted into a cassette player (not shown). Casing 2 is formed with side walls 4, a cover 5, a bottom wall 6 and an open rear side provided with a door 7, the latter being more fully described below.

As shown clearly in FIG. 1, cover 5 has a rectangular cut-out portion 8 contiguous with end 3 at one corner thereof. A cleansing wad or pad 9 is adapted to be inserted into the cut-out portion 8, such that the former is directly opposite a capstan 10 when the cassette casing 2 is installed in a player.

Referring now to FIGS. 2 and 3, there are shown details of construction of the end 3 of casing 2. Wad 9 is located between a pair of laterally-spaced upright members 11, which are preferably held in place by screws 11' (seen in FIG. 1).

A semi-flexible band 12, made of plastic or other suitable material, is also provided. The rear end of band 12 projects out of the rear side of casing 2 and is preferably formed with a ring 12' by which it can be grasped. The opposite or front end portion of band 12 passes around the front surface portion of both upright members 11 and behind the cleansing wad 9 and then rearwardly to a peg 13 to which it is rigidly secured. As depicted in FIG. 3, it will be readily apparent that pulling ring 12' will bias cleansing wad 9 forwardly against the capstan 10, such that a large surface portion of the latter is in contact with the wad 9. Also, the vertical breadth of the wad 9 is sufficient to cleanse the entire surface of capstan 10.

The open rear side of cassette casing 2 is provided with a door 7. The latter is pivotally secured to the rear side of casing 2 at the corner diagonally opposite the corner which is adjacent the cleansing wad 9. Door 7 has upper end lower horizontal flanges 7' which overlie cover 5 and bottom wall 6. Door 7 extends short of side wall 4 adjacent the ring 12.

When door 7 is open, ring 12' can be pulled laterally as an extra precautionary measure to prevent casing 2 from becoming dislodged in the cassette player. Door 7 also allows access to the interior of casing 2 in which a plurality of replacement wads (not shown) are preferably stored.

In order to protect the playing and recording head of the cassette player during the cleansing of capstan 10, a cushion 15 is provided at end 3 of casing 2.

It is to be noted that both operative spools of the casing 2 have been removed, as well as the follower wheel of the capstan.

What I claim is:

1. A capstan cleaner for audio cassette players having a cylindrical capstan for moving the tape in the cassette during a playing mode, said cleaner comprising an elongated casing having open front and rear ends, a bottom wall, a cover with side walls extending between and connecting the bottom wall to the cover, said casing adapted to be inserted into an audio cassette player to replace a standard cassette with its front end adjacent said capstan, said cover having a cutout portion adjacent said front end and one of said side walls which is positioned to be aligned with said capstan, said cutout portion being arranged to allow a capstan cleaning wad within said casing, and forward biasing means to manually push said wad in contact with said capstan with said wad curved around a portion of said capstan, said biasing means including first and second upright members generally extending parallel to said capstan and a peg rigidly secured to and located within said casing adjacent said front end, said first and second upright members disposed on opposite sides of said cutout portion, said first upright member located between one of said side walls and said cutout portion transversely of said casing, said second upright member spaced from said first upright member along a line transverse of said casing, said peg disposed rearwardly of said line and near said second upright member, an elongated flexible band having an end attached to said peg and passing around and forwardly of both upright members with the portion of said band between said upright members disposed behind and in contact with a wad inserted within said casing through said cutout portion, said band then extending rearwardly within said casing and having its other end protruding from the rear open end of said casing to be manually grasped for exerting an adjustable pressure of said wad on said capstan.

2. A capstan cleaner as claimed in claim 1, further including a grasping ring secured to said other end of said band.

3. A capstan cleaner as defined in claim 2, further including a door carried by the rear end of said casing and for closing said rear end, except the portion of said rear end through which said band extends.

* * * * *